United States Patent

Berg

[11] Patent Number: 5,353,720
[45] Date of Patent: Oct. 11, 1994

[54] REFUSE INCINERATOR

[76] Inventor: John E. Berg, 5286 Coldbrook Dr., Mantua, Ohio 44255

[21] Appl. No.: 77,379

[22] Filed: Jun. 17, 1993

Related U.S. Application Data

[63] Continuation of Ser. No. 17,515, Feb. 12, 1993.

[51] Int. Cl.$^5$ .............................. F23M 5/06
[52] U.S. Cl. ........................... 110/235; 110/346; 110/187
[58] Field of Search ............... 110/186, 188, 190, 235, 110/346, 185, 234, 228

[56] References Cited

U.S. PATENT DOCUMENTS

| | | |
|---|---|---|
| 4,411,204 | 10/1983 | Hamilton .................. 110/347 |
| 4,598,650 | 7/1986 | Schneckenberger ....... 110/246 |
| 4,630,555 | 12/1986 | Guillaume et al. ......... 110/346 |
| 4,848,250 | 7/1989 | Wunderley ................ 110/235 |
| 5,052,310 | 10/1991 | Goff et al. ................. 110/234 |

Primary Examiner—Henry A. Bennett
Assistant Examiner—William C. Doerrler
Attorney, Agent, or Firm—Albert E. Chrow

[57] ABSTRACT

An incinerator (200) is provided for burning combustible refuse (16) in a primary combustion chamber (2) that has an outlet (50) for exhaust heat (30) and an inlet (28) for receiving refuse (16) and an inlet (36) for receiving a mixture of pressurized oxygen and pressurized hydrogen at respective rates correlated to create a burn temperature within chamber (2) of at least 4000° F. to provide exhaust heat that is more environmentally acceptable.

13 Claims, 2 Drawing Sheets

REFUSE INCINERATOR

INTRODUCTION

This invention relates generally to an incinerator for burning combustible refuse and more particularly to a combustible refuse burning incinerator into the primary combustion chamber of which are delivered both the refuse and pressurized oxygen at rates respectively controlled to provide a burn temperature of at least 4000° F. and more preferably at a temperature of about 4200° F. to render the exhaust heat more environmentally acceptable. This is a continuation of application Ser. No. 017,515 filed on Feb. 12, 1993.

BACKGROUND OF THE INVENTION

A great variety of incinerators for burning combustible refuse, rubbish, or other waste materials have been developed over the years of which examples are disclosed in U.S. Pat. Nos. 4,009,667; 4,285,282; 4,545,306; 4,753,181; 4,759,300; 4,838,183; 4,949,653; 5,020,456; 5,060,584; 5,081,940 and 5,105,747, the disclosures of all of which are incorporated herein by reference.

Of the above referenced patents, U.S. Pat. Nos. 4,009,667; 5,020,456; 5,060,584 and 5,081,940 teach introduction of air into a combustion chamber by blowers and the like to assist in the burning process but do not disclose the temperature at which the refuse is burned.

Of those patents described above that do disclose the refuse burning temperature, U.S. Pat. No. 4,285,282 teaches introducing air into the primary combustion chamber to create a burn temperature of 1000° F.; U.S. Pat. No. 4,545,306 discloses the use of a combination of air and oxygen but not oxygen alone to provide a burn temperature up to 3500° F.; U.S. Pat. No. 4,753,181 teaches the provision of a burn temperature of from 2000° F. to thermally degrade dioxins; U.S. Pat. No. 4,838,183 teaches a combustion chamber burn temperature of 1400° F. to 1600° F. to burn waste refuse; U.S. Pat. No. 4,949,653 teaches a three zone combustion chamber of which the first is a zone for melting aluminum at a temperature of 1000° F. to 1650° F. to 2200° F., the second zone is for melting glass at a temperature of 1560° F., and the third zone is for melting steel at a temperature of 3500° F.; and U.S. Pat. No. 5,105,747 teaches the introduction of oxygen into a secondary oxygen deficient zone to create a burn temperature of 1600° F. to 2400° F.

The only example in the above described patents that teach a burn temperature above 3000° F. is U.S. Pat. No. 4,759,300 which discloses a pyrolysis process by which waste products are pyrolized at a temperature of between 400° C. and 800° C. in an atmosphere that is kept essentially oxygen free by exclusion of air.

None of the heretofore described patents teach or suggest introducing pressurized oxygen or a mixture of pressurized oxygen and hydrogen into the primary combustion chamber at a rate correlated with the refuse input rate to provide a burn temperature of at least 4000° F. and preferably at a temperature of about 4200° F. to assist in rendering the exhaust heat more environmentally acceptable.

SUMMARY OF THE INVENTION

Accordingly, it is an object of this invention to provide an incinerator for burning refuse and the like.

It is another object of this invention to provide a refuse burning incinerator into whose primary combustion chamber pressurized oxygen or a mixture of pressurized oxygen and pressurized hydrogen is introduced.

It is still another object of this invention to provide an incinerator for burning refuse that in a preferred embodiment is portable.

It is another object of this invention to provide an incinerator having a primary combustion chamber into which both refuse and pressurized oxygen or a mixture of pressurized oxygen and hydrogen are introduced at respective rates correlated to provide a burn temperature of at least 4000° F. to render the exhaust heat more environmentally acceptable.

DESCRIPTION OF SOME PREFERRED EMBODIMENTS

Figure 1:
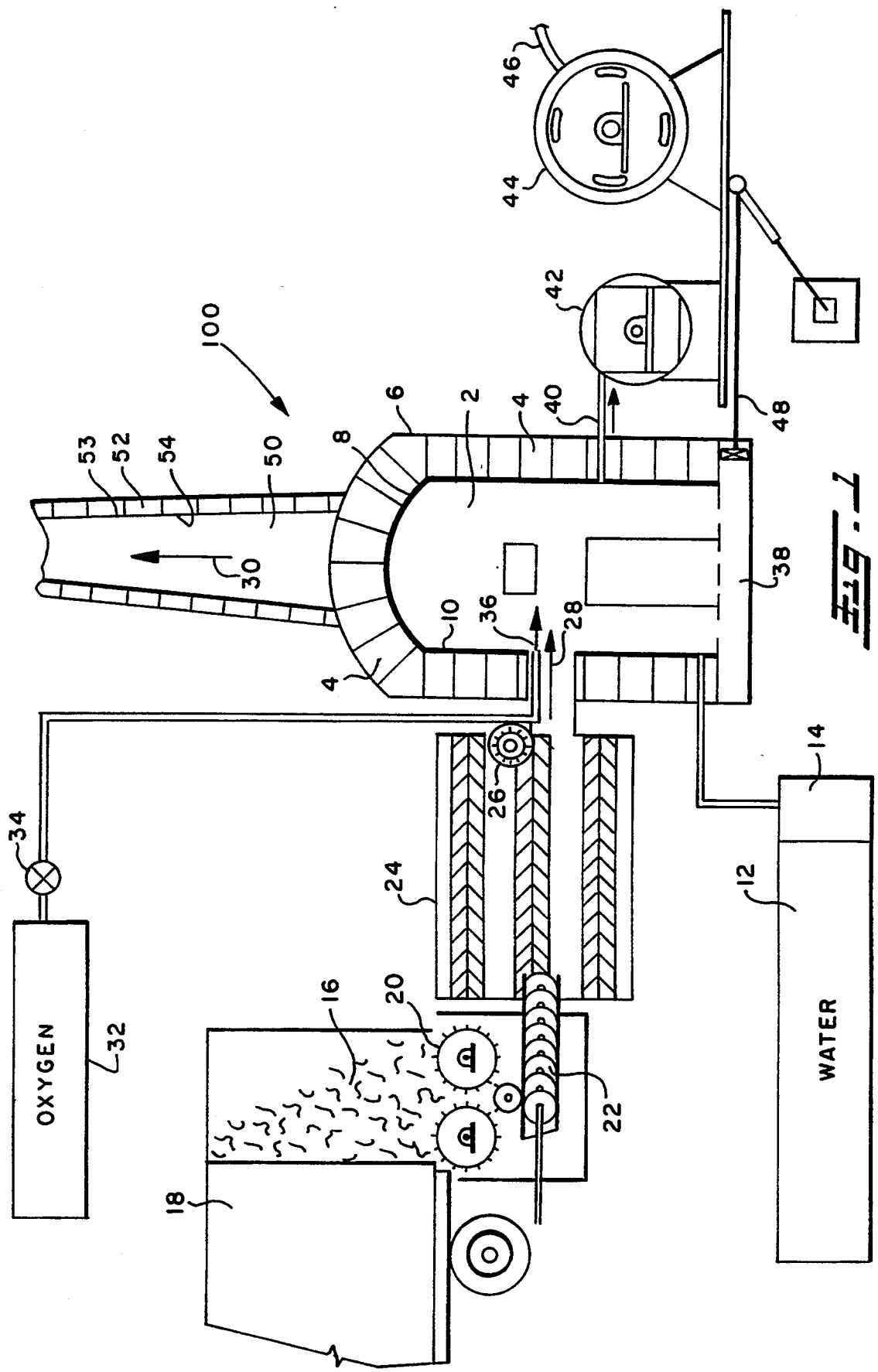
FIG. 1 is a partially cross-sectioned side view of an embodiment of the incinerator of the invention using pressurized oxygen referenced by numeral 100.
Figure 2:
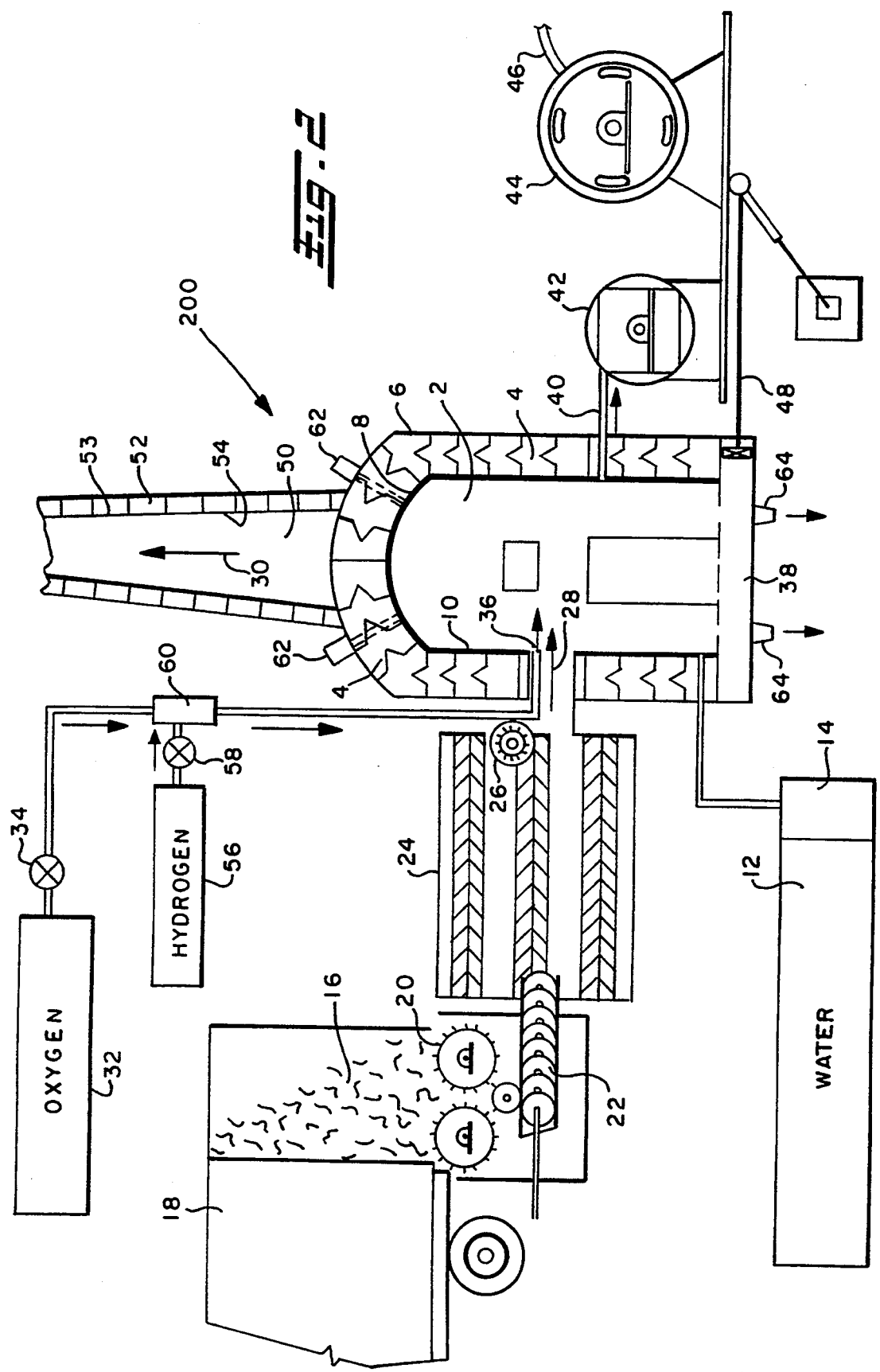
FIG. 2 is a partially cross-sectioned side view of an embodiment of the incinerator of the invention using a pressurized mixture of oxygen and hydrogen referenced by numeral 200.

In FIG. 1, refuse incinerator 100 has a primary combustion chamber 2 enclosed by fire brick 4 such as Harberson Walker 5000° F. rated fire brick well known to those skilled in the art of fire brick to suitably withstand the high burn temperature required of at least 4000° F. As shown in FIG. 2, fire brick 4 is preferably an interlocking type fire brick that does not require motor due to the high combustion temperatures involved that may deteriorate the motor.

The surface of fire brick 4 facing inwardly towards chamber 2 is preferably sealed with a ceramic coating that preferably has an even higher temperature rating than fire brick 4 such as a 6000° F. temperature rating.

Chamber 2 has an inlet referenced by numeral 28 for receiving combustible refuse 16 thereunto that is conveyed to inlet 28 at a controlled rate such as provided for example, by controlling the rotational speed of auger 22. Refuse 16 is preferably shredded by means of a suitable shredder referenced by numeral 20 well known to those skilled in the art of refuse shredders such as manufactured by International Harvester Company.

Refuse 16 is delivered to the hopper of shredder 20 by a typical refuse hauling truck or other transport device referenced by numeral 18 such as a self unloading trailer manufactured by East Manufacturing Company. The shredder refuse is then conveyed by a suitable auger 22 towards the viewer's right in FIG. 1 which is towards inlet 28 of combustion chamber 2.

Refuse 16 is preferably dried to a water content of less than a prescribed amount that is preferably less than about five (5) percent by weight water per weight of refuse by means of a suitable dryer referenced by numeral 24 well known to those skilled in the art of drying refuse such as refuse dryers manufactured by Gehl Manufacturing that are operable to dry the refuse with the aid of a suitable blower such as referenced by numeral 26 that preferably has a rotational speed blade of at least about 3400 rpm.

Refuse 16 is thus conveyed at a controlled rate into inlet 28 in preferably a shredded and dried condition.

Chamber 2 also has an inlet referenced by numeral 36 enabling pressurized oxygen to be delivered into chamber 2 from a pressurized oxygen source referenced by numeral 32 whose rate of delivery into chamber 2 is controlled by a suitable flow control valve referenced by numeral 34. Although not shown in FIG. 1, suitable oxygen sensors are disposed about and within chamber 2 and operative to sense the level of oxygen in chamber 2 especially during the period of burning and, through suitable feed-back signals adjust control valve 34 as may be required to correlate the flow rate with the input rate of refuse 16 to create and maintain a burn temperature within chamber 2 of at least 4000° F.

As in the case of oxygen sensors, suitable temperature measuring devices such as infra-red temperature measuring devices are employed to monitor the burn temperature within chamber 2 that likewise independently and/or in combination with the oxygen sensors are provided with feed-back-back controls operative to control the input rate of either or both the refuse and pressurized oxygen to create a burn temperature in chamber 2 of at least 4000° F.

Chamber 2 is also provided with an outlet 50 enabling exhaust heat referenced by numeral 30 to flow into the atmosphere. Chamber 2 is further preferably provided with one or more pressure relief valves such as referenced by numerals 62 in FIG. 2 that are suitably heat resistant and operative to maintain pressure within chamber 2 below a predetermined maximum.

Outlet 50 is preferably in the form of a tapered stack shown in FIG. 1 and is also preferably enclosed by a Harrison Walker Company 5000° F. rated fire brick having its inner surface lined with a heat and corrosion resistant metal referenced by numeral 53 such as stainless steel having a thickness of preferably about ⅛ inch.

The metal liner 53 also preferably has its inner surface coated with a suitable high temperature ceramic referenced by numeral 54 that is preferably rated to withstand a temperature of at least 6000° F.

The outer surface of fire bricks 4 and 52 is preferably lined with a heat and corrosion resistant metal such as a suitable stainless steel having a thickness of preferably about 1/16 inch.

Chamber 2 preferably includes a ceramic coated water jacket therewithin that is referenced by numeral 10 in FIG. 1. Water jacket 10 conveys water that is pumped from a water tank or reservoir 12 by means of a suitable pump referenced by numeral 14. The water is conveyed through water jacket 10 from tank 12 to an outlet referenced by numeral 40 preferably at a rate effective to convert the water to steam from the heat of the refuse burn temperature of at least 4000° F. as it passes through jacket 10 from tank 12 to outlet 40.

One advantage of having either heated water and more preferably steam produced by the incinerator of the invention is the ability to drive a dynamo or steamed turbine such as referenced by numeral 42 which in turn drives an electrical generator referenced by numeral 44 to produce electrical current conveyed to consumers through electrical cables referenced by numeral 46.

The residue of the burned refuse in chamber 2 drops into a depository referenced by numeral 38 and is preferably removed from the depository 38 by means of a scraper mechanism such as referenced by numeral 48. Depository 38 further preferably includes drain outlets such as referenced by numerals 64 in FIG. 2 to enable any liquified waste by-product to drain from depository 38 for suitable collection.

Refuse incinerator 200 of FIG. 2 is, in many respects, the same as incinerator 100 heretofore described with respect to FIG. 1. Incinerator 200 illustrates a preferred embodiment of the invention by which a source of pressurized hydrogen referenced by numeral 56 is released at a predetermined rate by means of a suitable flow control valve 58 into a mixing valve 60 that also receives pressurized oxygen from source 32 through flow control valve 34.

The resultant pressurized mixture of oxygen and hydrogen is released in chamber 2 such as referenced by numeral 36.

Although pressurized oxygen in FIG. 1 and the mixture of pressurized oxygen and hydrogen in FIG. 2 are shown entering at the side of chamber 2 in conjunction with refuse 16, either or both may either alternately or additionally enter chamber 2 at different locations such as entering chamber 2 from the bottom. Also, although shown in FIG. 2 as first meeting in a suitable mixing valve 60 prior to entry into chamber 2, the pressurized oxygen and hydrogen may enter separately into chamber 2 and mix therewith.

As in the case of using pressurized oxygen alone, one or more hydrogen sensors may be employed along with oxygen sensors about and within chamber 2 to sense the level of oxygen and hydrogen, especially during the period of burning and, through suitable feed-back signals adjacent either or both control valves 34 and 58 to correlate the flow rate of the pressurized mixture of oxygen and hydrogen with the input rate of refuse 16 into chamber 2 to create and maintain a burn temperature within chamber 2 of at least 4000° F.

The mixing ratio of pressurized oxygen and hydrogen is determined by the flow rate and type of refuse 16 to be incinerated in a substantially continuous manner. Generally, the gaseous ratio may range from about 5% to about 95% by weight or volume of oxygen to the total weight or volume of the mixture of oxygen and hydrogen.

What is claimed is:

1. An incinerator for burning combustible refuse comprising:

a primary combustion chamber having an inlet and a depository for residue and an outlet for discharging exhaust heat;

means for conveying the refuse into the combustion chamber inlet at a controlled rate, a pressurized oxygen source, a pressurized hydrogen source, means for mixing the pressurized oxygen and pressurized hydrogen together outside of the combustion chamber, and means for conveying the pressurized oxygen and the pressurized hydrogen mixture into the combustion chamber at a rate corrrelated with the refuse input rate to create a burn temperature within the combustion chamber of at least 4000° F.

2. The incinerator of claim 1 including means for drying the refuse prior to entering the chamber inlet to less than a prescribed water content.

3. The incinerator of claim 1 including means for shredding the refuse prior to entering the chamber inlet.

4. The incinerator of claim 2 including means for shredding the refuse prior to the drying thereof.

5. The incinerator of claim 1 including a water jacket within the chamber and operable to convey pressurized water therethrough from a water source to an outlet at a rate effective to enable the water to be converted to steam by the heat of the burning refuse.

6. The incinerator of claim 5 wherein the steam is utilized to drive an electrical generator for the generation of electrical energy.

7. The incinerator of claim 1 introducing means for removing the residue from the chamber depository.

8. The incinerator of claim 7 wherein the means for removing the residue from the chamber depository is a scraping mechanism.

9. The incinerator of claim 1 wherein the burn temperature is about 4200° F.

10. The incinerator of claim 1 in the form of a portable incinerator.

11. An incinerator for burning combustible refuse comprising:

a combustion chamber having an inlet and a depository for residue and an outlet for discharging exhaust heat, means for conveying the refuse into the combustion chamber inlet at a controlled rate, a pressurized oxygen source, a pressurized hydrogen source, means for mixing the pressurized oxygen and the pressurized hydrogen together outside of the combustion chamber, means for conveying the pressurized oxygen and the pressurized hydrogen mixture into the combustion chamber at a rate correlated with the refuse rate to create a burn temperature within the chamber of at least 4000° F., means for shredding the refuse prior to conveyance thereof into the combustion chamber inlet, means for drying the shredded refuse to less than a prescribed water content prior to the conveyance thereof into the combustion chamber inlet, a water jacket within the combustion chamber and operable to convey water therethrough from a water source to an outlet at a rate effective to enable the water to be converted to steam by the heat of the burning refuse, means for converting the steam to electrical energy, and means for removing the refuse from the chamber depository.

12. The incinerator of claim 11 wherein the burn temperature is about 4200° F.

13. The incinerator of claim 11 in the form of a portable incinerator.

* * * * *